(12) United States Patent
Abe et al.

(10) Patent No.: US 6,343,758 B1
(45) Date of Patent: Feb. 5, 2002

(54) PRETENSIONER FOR WEBBING RETRACTOR

(75) Inventors: Minoru Abe; Seiji Hori, both of Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 09/557,956

(22) Filed: Apr. 25, 2000

(30) Foreign Application Priority Data

Apr. 30, 1999 (JP) .......................................... 11-124095

(51) Int. Cl.[7] .............................................. B60R 22/46
(52) U.S. Cl. ......................... 242/374; 280/806; 60/632
(58) Field of Search ........................ 242/374; 280/806; 297/478, 480; 60/632, 633, 634, 635, 636, 637, 638

(56) References Cited

U.S. PATENT DOCUMENTS

| | | | | |
|---|---|---|---|---|
| 5,284,307 A | * | 2/1994 | Kotama | 242/374 |
| 5,842,344 A | * | 12/1998 | Schmid | 242/374 |
| 5,956,954 A | * | 9/1999 | Schmid | 60/636 |
| 6,017,060 A | * | 1/2000 | Wilson et al. | 280/806 |
| 6,042,041 A | * | 3/2000 | Foster et al. | 242/374 |
| 6,089,492 A | * | 7/2000 | Nagata et al. | 242/374 |
| 6,155,512 A | * | 12/2000 | Specht et al. | 242/374 |

FOREIGN PATENT DOCUMENTS

| | | |
|---|---|---|
| JP | 2-48464 | 4/1990 |
| JP | 9-202213 | 8/1997 |

* cited by examiner

*Primary Examiner*—John M. Jillions
(74) *Attorney, Agent, or Firm*—Nixon Peabody LLP; Thomas W. Cole (57) ABSTRACT

In a pretensioner for a webbing retractor, an upper wall portion of a sealing member extends arcuately around an external periphery of a seal holding portion which is formed integrally with a bottom surface of a piston, and the sealing member includes a side wall portion proximate an inner wall of a cylinder. The sealing member is formed from an elastic material, and may be annular or a ring with an angle of 360 degrees or more. In an emergency state of a vehicle, when the piston is moved by gas pressure, the sealing member is pressed against the bottom surface of the piston by gas pressure, and a diameter of the sealing member is increased. Accordingly, the sealing member provides sealing between the piston and the inner wall of the cylinder.

17 Claims, 9 Drawing Sheets

PRETENSIONER FOR WEBBING RETRACTOR

BACKGROUND OF THE INVENTION

1. Field of the Invention

The present invention relates to a pretensioner for a webbing retractor, which eliminates slackness in a webbing by forcefully winding the webbing onto a winding shaft when a vehicle is in a state of emergency such as a collision.

2. Description of the Related Art

There are webbing retractors which include a pretensioner for eliminating slackness in a webbing by forcefully winding the webbing onto a winding shaft when a vehicle is in a state of emergency such as a collision.

Figure 9:
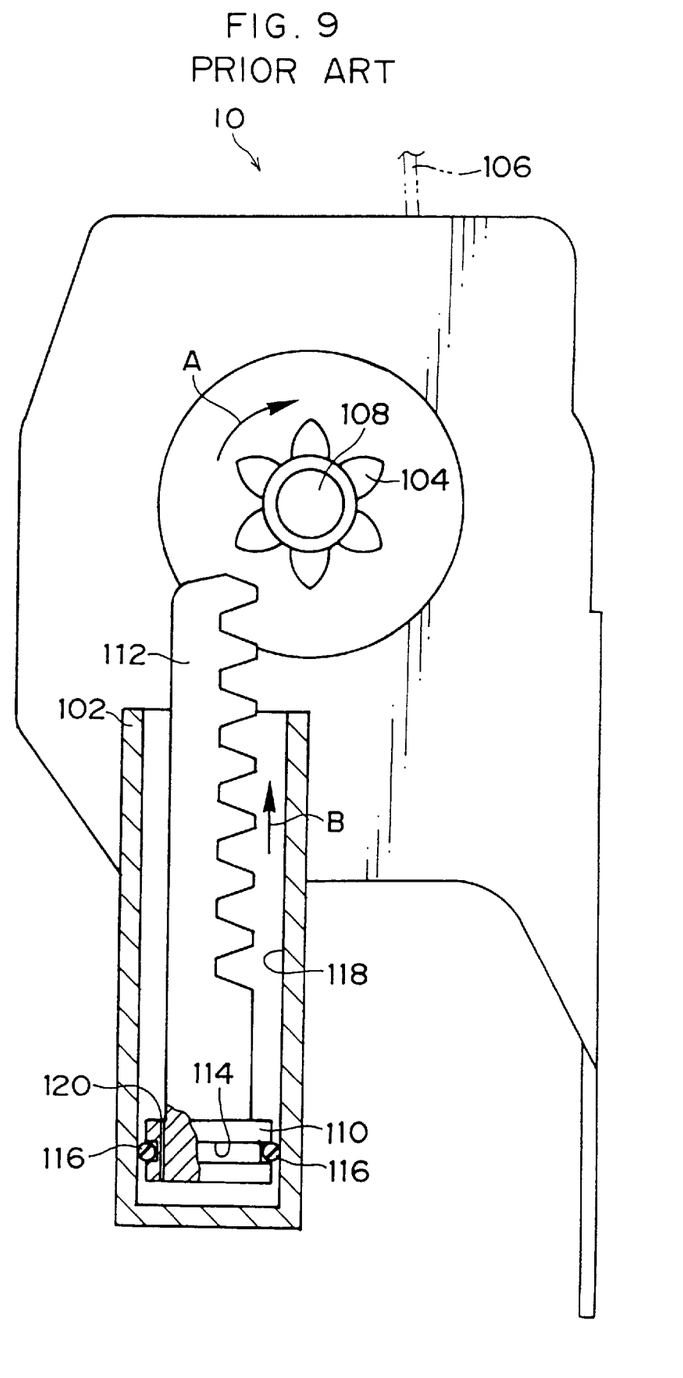
FIG. 9 is a side view of a schematic structure of a conventional webbing retractor.

Among such pretensioners, there is what is known as a rack-and-pinion type of pretensioner. In a webbing retractor 100 such as shown in FIG. 9 which is provided with the rack-and-pinion type pretensioner, a pinion 104 is connected to a winding shaft 108 onto which a webbing 106 is wound, such that the pinion always rotates integrally with the winding shaft 108. A cylinder 102 is provided near the pinion 104 so that gas is supplied into the cylinder 102 when the vehicle is in a state of emergency.

A piston 110 is movably provided inside the cylinder 102. When the vehicle is in a state of emergency, the piston 110 is moved in the direction of the arrow B in FIG. 9 by the gas pressure. A rack 112 is provided integrally with the top surface of the piston 110. Due to the rack 112 moving together with the piston 110, the rack 112 meshes with the pinion 104 and rotates the pinion 104 in the direction in which the webbing 106 is wound (the direction of the arrow A in FIG. 9). Accordingly, when the vehicle is in a state of emergency, the webbing 106 is wound onto the winding shaft 108 and the slackness in the webbing 106 is eliminated.

A seal holding groove 114 is formed in the side surface of the piston 110 by a cutting process, and a rubber O ring 116 is fitted into the seal holding groove 114. The O ring 116 seals the gap between the piston 110 and an inner wall 118 of the cylinder 102, thus improving the air-tightness between the piston 110 and the cylinder 102. Further, a vent hole 120 is formed from the bottom surface of the piston 110 through to the top surface thereof. Accordingly, when the pretensioner is operated, the gas passes from the bottom surface side of the piston 110 to and out of the top surface side thereof through the vent hole 120. This prevents the gas pressure inside the cylinder 102 from excessively increasing.

However, in this type of webbing retractor 100, much work is required by the machining (working) for forming the seal holding groove 114 and the vent hole 120 in the piston 110. As a result, costs are increased.

Further, the diameter of the O ring 116 needs to be increased so as to fit into the seal holding groove 114. As a result, the assembly is difficult.

SUMMARY OF THE INVENTION

In consideration of the above facts, it is an object of the present invention to provide a pretensioner for a webbing retractor, which facilitates the machining of the piston and reduces the costs, and which facilitates assembly.

According to the present invention, the pretensioner for a webbing retractor comprises: a cylinder having an inner wall, the cylinder being for receiving gas therein from a gas generating agent when the vehicle is in a state of emergency; a piston movably provided inside the cylinder for rotating the winding shaft in a direction for winding the webbing due to piston movement inside the cylinder caused by gas pressure; a sealing member formed from an elastic material in an arcuate (annular or ring-like with an angle of 360 degrees and more) shape, and provided proximate a bottom surface of the piston for sealing a gap between the piston and the inner wall of the cylinder due to the sealing member being pressed against the bottom surface of the piston by gas pressure; and a cylindrical protruding seal holding portion having an upper wall portion and an external periphery formed integrally with the bottom surface of the piston, the sealing member extending arcuately around the external periphery of the seal holding portion, and the sealing member including a side wall portion proximate the inner wall of the cylinder.

When the vehicle is in a state of emergency, the gas is supplied into the cylinder and the piston is moved by the gas pressure. When the piston is moved, the winding shaft is rotated in the direction in which the webbing is wound, the webbing is wound onto the winding shaft, and thus the slackness in the webbing is eliminated. When the piston is moved by the gas pressure, the elastic and arcuate sealing member is pressed against the bottom surface of the piston by the gas pressure such that the diameter of the sealing member is increased, and the side wall portion of the sealing member is pressed against the inner wall of the cylinder. Accordingly, the sealing member seals the gap between the piston and the inner wall of the cylinder, and the air-tightness between the piston and the cylinder is improved.

In this manner, merely by making the sealing member proximate the bottom surface of the piston, the sealing member can provide sealing between the piston and the inner wall of the cylinder, and thus, a conventional seal holding groove does not need to be formed in the piston. This facilitates the machining of the piston and reduces the costs.

Preferably, in the above-described pretensioner for a webbing retractor, a cylindrical protruding seal holding portion having an annular upper wall portion and an external periphery, is formed integrally with the bottom surface of the piston, the upper wall portion of the sealing member extending arcuately around the external periphery of the seal holding portion, and the sealing member includes a side wall portion proximate the inner wall of the cylinder.

The upper wall portion of the sealing member extends arcuately around the external periphery of the seal holding portion which is formed integrally with the bottom surface of the piston, and thus the sealing member does not come off from the piston. Therefore, the sealing member can securely provide sealing between the piston and the inner wall of the cylinder.

Further, merely by fitting the upper wall portion of the sealing member onto the external periphery of the seal holding portion which is formed integrally with the bottom surface of the piston, the sealing member can be assembled with the piston. Therefore, increasing the diameter of an O ring to fit the O ring into the seal holding groove such as in the conventional manner is unnecessary. This facilitates assembly.

More preferably, in the above-described pretensioner for a webbing retractor, the sealing member includes a side wall portion and an upper wall portion, and a discontinuity formed at the sealing member, the discontinuity being continuous with the upper wall portion and the side wall portion of the sealing member, the piston having a bottom surface side and a top surface side, wherein the discontinuity defines a path fluid communication from the bottom surface side of the piston to the top surface side of the piston.

When the pretensioner is operated, the gas flows out from the bottom surface side of the piston to the top surface side thereof through the discontinuity of the sealing member. This prevents the gas pressure inside the cylinder from excessively increasing. Gas is an example of fluid. Accordingly, a conventional vent hole does not need to be formed in the piston. This facilitates the machining of the piston and reduces the costs.

The sealing member is formed in an arcuate shape, and the discontinuity is formed at the sealing member. Thus, the diameter of the sealing member is increased more easily by the gas pressure. This can improve the sealing of the gap between the piston and the inner wall of the cylinder even more.

More preferably, in the above-described pretensioner for a webbing retractor, the gas generating agent has an ignition temperature, and the sealing member is formed of a material having a melting point no more than the ignition temperature of the gas generating agent.

The sealing member is formed of a material having a melting point no more than the ignition temperature of the gas generating agent. Thus, when the pretensioner is operated in a high temperature state such as in a fire, portions of the sealing member soften (liquefy), and the gas flows out from the bottom surface side of the piston to the top surface side thereof. This can prevent the gas pressure inside the cylinder from excessively increasing even in a high temperature state. Therefore, even if the strengths required of the cylinder, the rack, the pinion and the like are set to lower levels, the parts can be prevented from being blown off and damaged by the gas pressure.

DESCRIPTION OF THE PREFERRED EMBODIMENTS

Figure 1:
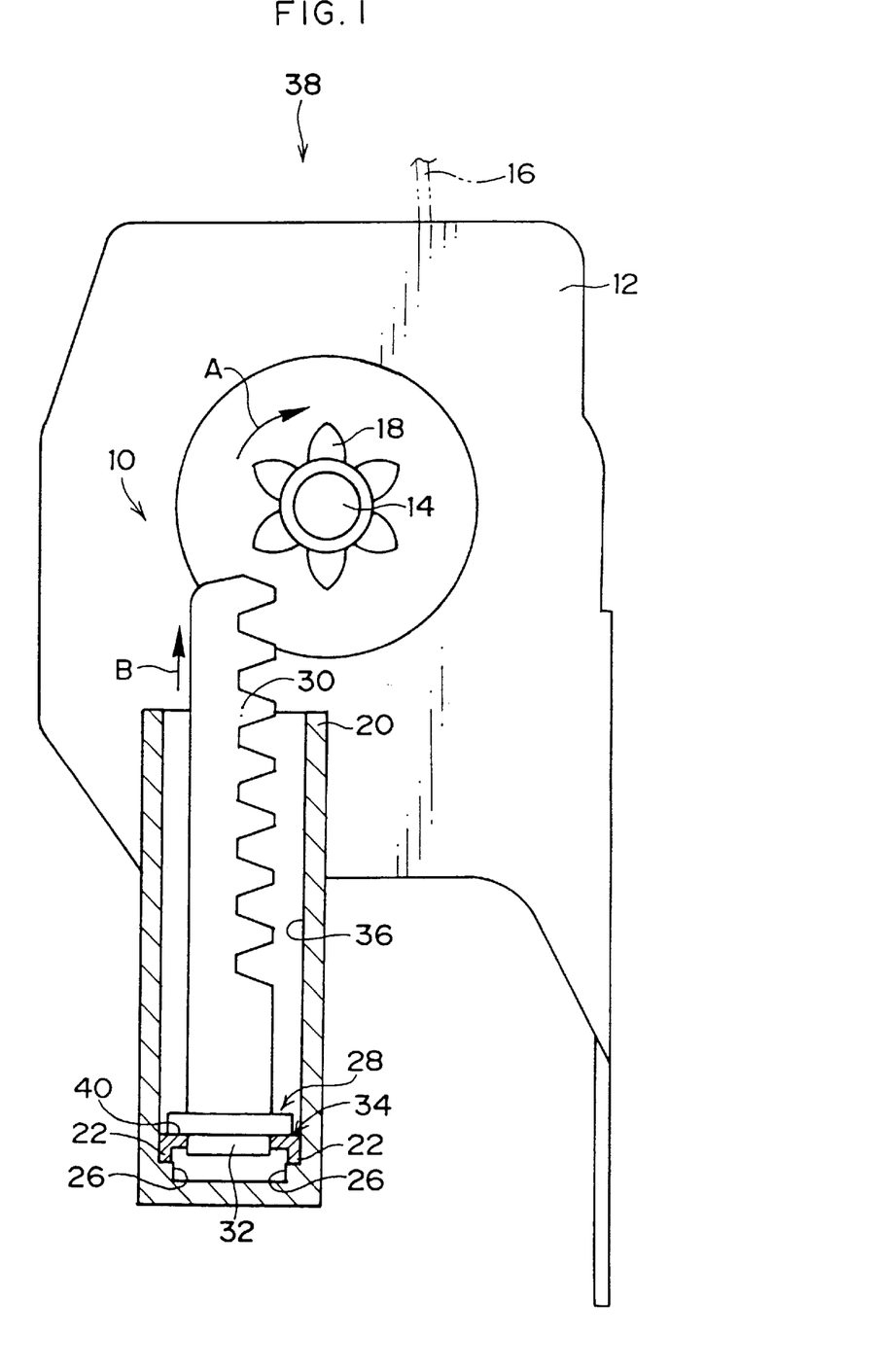
FIG. 1 is a side view of a schematic structure of a webbing retractor to which a pretensioner for a webbing retractor according to an embodiment of the present invention is applied.
Figure 2:
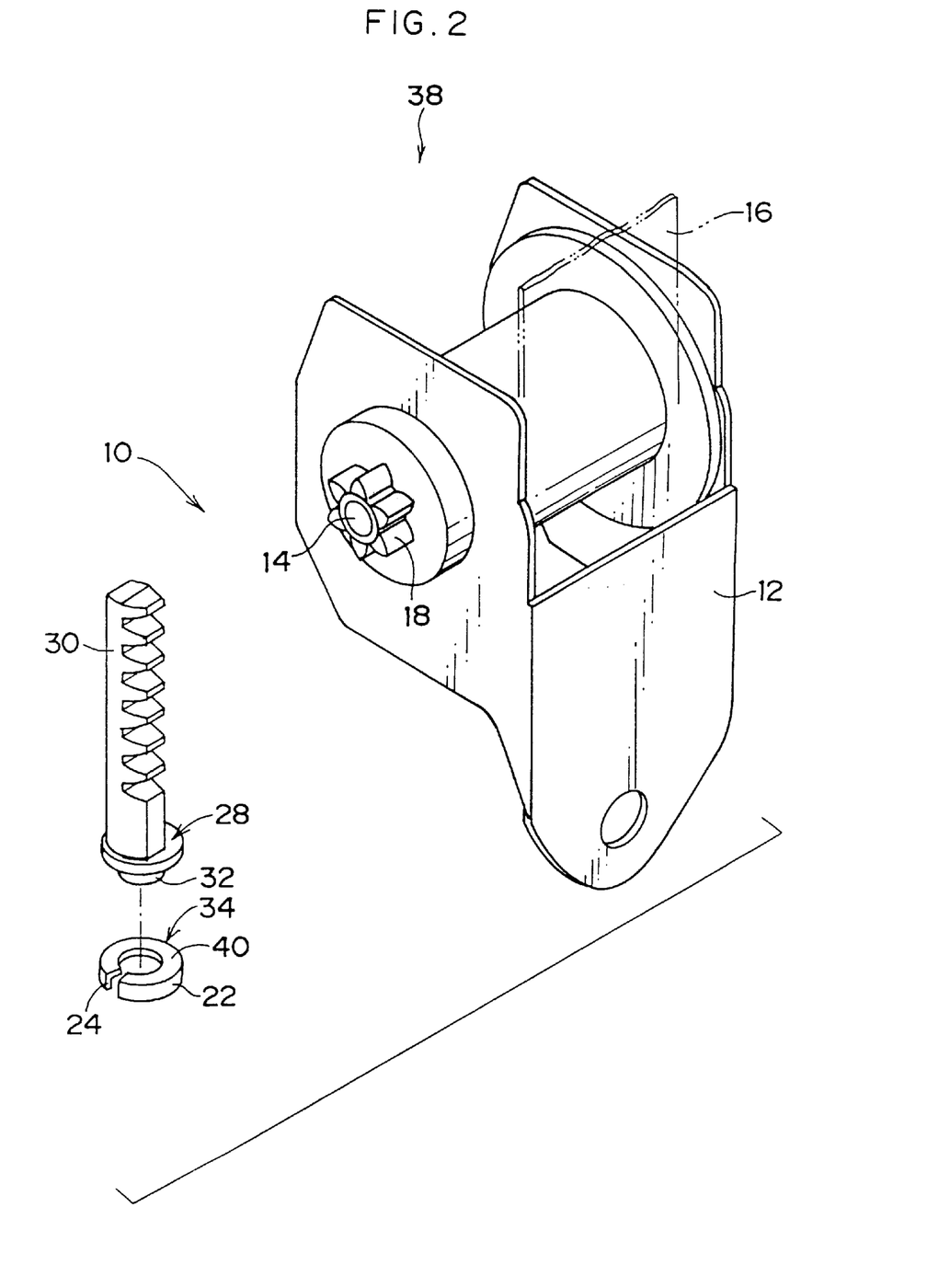
FIG. 2 is an exploded perspective view of the schematic structure of the webbing retractor according to the embodiment of the present invention.
Figure 3:
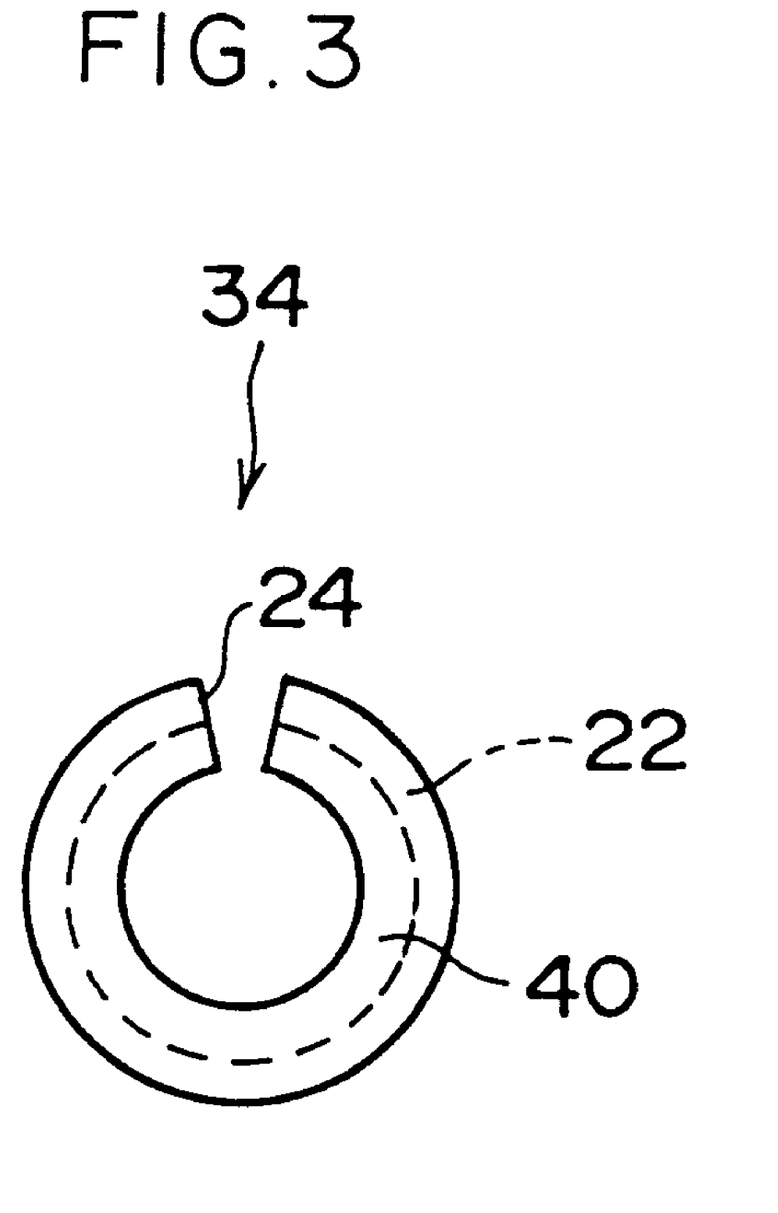
FIG. 3 is a top view of a piston ring of the webbing retractor according to the embodiment of the present invention.

FIG. 1 is a side view of a schematic structure of a webbing retractor 38 to which a pretensioner 10 for a webbing retractor according to an embodiment of the present invention is applied. FIG. 2 is an exploded perspective view of the schematic structure of the webbing retractor 38. FIG. 3 is a top view of a piston ring 34 of the webbing retractor 38.

The webbing retractor 38 includes a frame 12, which is fixed to a vehicle. A winding shaft 14 is rotatably supported at the frame 12, and a webbing 16 is wound onto the winding shaft 14.

The webbing retractor 38 further includes a rack-and-pinion type of pretensioner 10. A pinion 18 is disposed at one end of the winding shaft 14 via an unillustrated roller. Because the pinion 18 is connected to the winding shaft 14 via the roller, when the pinion 18 is rotated, the webbing 16 is either wound onto or unwound from the winding shaft 14.

A cylinder 20 is fixed to the frame 12. The cylinder 20 is formed in a hollow cylindrical shape with the top end side thereof open in the vicinity of the pinion 18. A receiving portion 26 having a smaller diameter than the internal diameter of the cylinder 20 is integrally formed with the bottom portion side of an inner wall 36 of the cylinder 20. The receiving portion 26 abuts a lower end of a side wall portion 22 of a piston ring 34 which will be described below, and determines the holding position of the piston ring 34. Further, in the bottom portion side of the cylinder 20 (below the holding position of the piston ring 34), an unillustrated gas supplying aperture is provided. When the vehicle is in a state of emergency such as a collision, the gas which is generated by burning a gas generating agent is supplied into the cylinder 20 from this gas supplying aperture.

A substantially disc-shaped piston 28 is movably provided inside the cylinder 20. Accordingly, when the gas is supplied into the cylinder 20, the piston 28 is moved in the direction of the arrow B in FIG. 1 by the gas pressure.

A rack 30 is provided integrally with the top surface of the piston 28. The rack 30 corresponds to the pinion 18, and thus, when the rack 30 is moved together with the piston 28 in the direction of the arrow B in FIG. 1, the rack 30 meshes with the pinion 18 and rotates the pinion 18 in the direction in which the webbing 16 is wound (the direction of the arrow A in FIG. 1).

A cylindrical protruding seal holding portion 32 is formed integrally with the bottom surface of the piston 28. An upper wall portion 40 of the piston ring 34, which will be described below, is fitted onto the external periphery of the seal holding portion 32.

The piston ring 34, which is made of resin and serves as a sealing member, is provided so as to abut the bottom surface of the piston 28. The upper wall portion 40, which is substantially ring-shaped, and the side wall portion 22, which extends vertically downward from the external peripheral portion of the upper wall portion 40, are formed at the piston ring 34, such that the entire piston ring 34 is structured in a substantially cylindrical shape. The upper wall portion 40 of the piston ring 34 is fitted onto the external periphery of the above-described seal holding portion 32 of the piston 28, and thus the piston ring 34 is held on the piston 28. The side wall portion 22 of the piston ring 34 abuts the inner wall 36 of the cylinder 20, and the lower end of the side wall portion 22 of the piston ring 34 abuts the receiving portion 26 which is formed integrally with the inner wall 36.

The piston ring 34 is elastic, and thus, when the gas is supplied into the cylinder 20, the piston ring 34 is pressed against the bottom surface of the piston 28 by the gas pressure and the diameter of the piston ring 34 is increased, and the side wall portion 22 of the piston ring 34 is pressed against the inner wall 36 of the cylinder 20. Accordingly, when the pretensioner is operated, the piston ring 34 seals the gap between the piston 28 and the inner wall 36 of the cylinder 20. Further, an aperture portion 24 which is continuous with the upper wall portion 40 and the side wall portion 22 is formed in the piston ring 34. This aperture portion 24 permits gas flow from the bottom surface side of the piston 28 to the top surface side thereof. This prevents the gas pressure inside the cylinder 20 from excessively increasing. Further, the melting point of the material of which the piston ring 34 is formed is no more than the ignition temperature of the gas generating agent. When the pretensioner is operated in a high temperature state (e.g. about 200° C.) such as in a fire, portions of the piston ring 34 soften (liquefy), and the gas flows out from the bottom surface side of the piston 28 to the top surface side thereof. Thus, the piston ring 34 is structured so as to prevent the gas pressure inside the cylinder 20 from excessively increasing even in a high temperature state.

The operation of the present embodiment will now be explained.

In the webbing retractor 38 with the above structure, when the vehicle is in a state of emergency, the gas is supplied into the cylinder 20, and the piston 28 is moved in the direction of the arrow B in FIG. 1 by the gas pressure. When the piston 28 is moved in the direction of the arrow B in FIG. 1, the rack 30 is also moved together with the piston 28, and then the rack 30 meshes with the pinion 18 and rotates the pinion 18 in the direction in which the webbing 16 is wound (the direction of the arrow A in FIG. 1). When the pinion 18 is rotated in the direction in which the webbing 16 is wound, because the pinion 18 is connected to the winding shaft 14 via the unillustrated roller, the webbing 16 is wound onto the winding shaft 14 and the slackness in the webbing 16 is eliminated. When the piston 28 is moved by the gas pressure, the elastic and substantially cylindrical piston ring 34 is pressed against the bottom surface of the piston 28 by the gas pressure such that the diameter of the piston ring 34 is increased, and the side wall portion 22 of the piston ring 34 is pressed against the inner wall 36 of the cylinder 20. Accordingly, the piston ring 34 seals the gap between the piston 28 and the inner wall 36 of the cylinder 20, and the air-tightness between the piston 28 and the cylinder 20 is improved.

In this manner, merely by making the piston ring 34 abut against the bottom surface of the piston 28, the piston ring 34 can seal the gap between the piston 28 and the inner wall 36 of the cylinder 20, and thus, a conventional seal holding groove does not need to be formed in the piston 28. Therefore, a cutting process for forming the seal holding groove in the piston 28 is unnecessary. This facilitates the machining of the piston 28 and reduces the costs.

The upper wall portion 40 of the piston ring 34 is fitted onto the external periphery of the seal holding portion 32 which is formed integrally with the bottom surface of the piston 28, and thus the piston ring 34 does not come off from the piston 28. Therefore, the piston ring 34 can securely seal the gap between the piston 28 and the inner wall 36 of the cylinder 20.

Further, merely by fitting the upper wall portion 40 of the piston ring 34 onto the external periphery of the seal holding portion 32 which is formed integrally with the bottom surface of the piston 28, the piston ring 34 can be assembled with the piston 28. Therefore, increasing the diameter of an O ring (i.e., stretching an O ring) to fit the O ring into the seal holding groove such as in the conventional manner is unnecessary. This facilitates assembly.

When the pretensioner is operated, the gas flows out from the bottom surface side of the piston 28 to the top surface side thereof through the aperture portion 24 of the piston ring 34. This prevents the gas pressure inside the cylinder 20 from excessively increasing. Accordingly, a conventional vent hole does not need to be formed in the piston 28. This facilitates the machining of the piston 28 and reduces the costs.

The piston ring 34 is formed in a substantially cylindrical shape, and the aperture portion 24 is formed in the piston ring 34. Thus, the diameter of the piston ring 34 is increased more easily by the gas pressure. This can improve the sealing of the gap between the piston 28 and the inner wall 36 of the cylinder 20 even more.

Moreover, the melting point of the material of which the piston ring 34 is formed is no more than the ignition temperature of the gas generating agent. Thus, when the pretensioner is operated in a high temperature state such as in a fire, portions of the piston ring 34 soften (liquefy), and the gas flows out from the bottom surface side of the piston 28 to the top surface side thereof. This can prevent the gas pressure inside the cylinder 20 from excessively increasing even in a high temperature state. Therefore, even if the strengths required of the cylinder 20, the rack 30, the pinion 18 and the like are set to lower levels, the parts can be prevented from being blown off and damaged by the gas pressure.

First Modified Example

Figure 4:
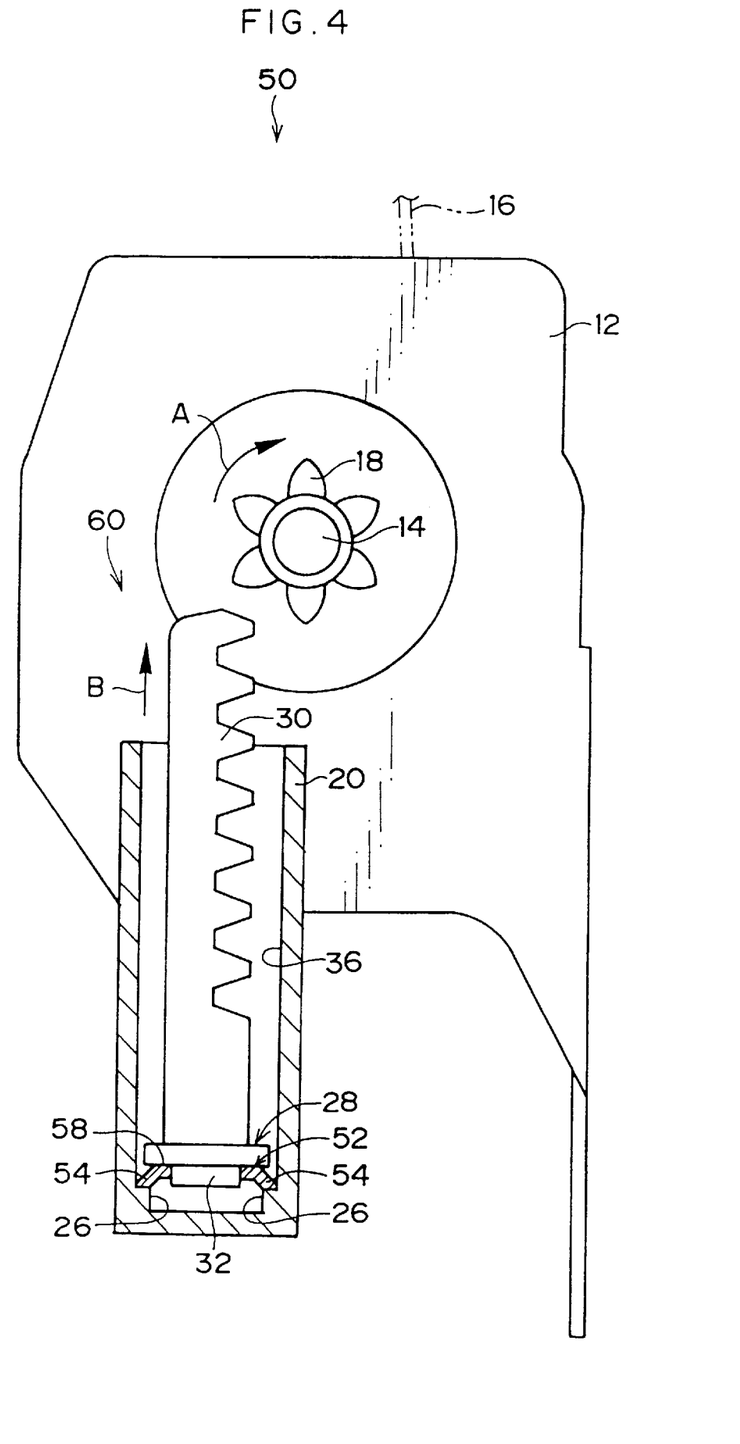
FIG. 4 is a side view of a schematic structure of a webbing retractor according to a first modified example of the present embodiment.
Figure 5:
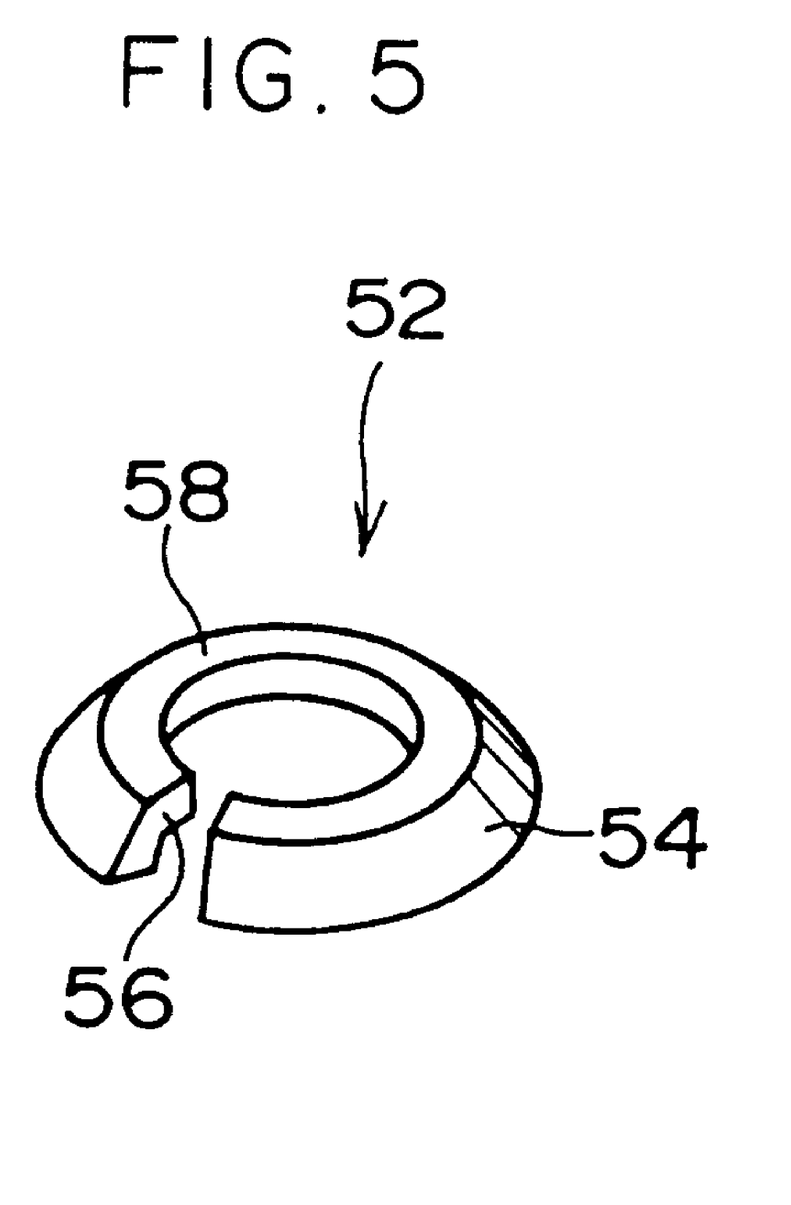
FIG. 5 is a perspective view of a piston ring of the webbing retractor according to the first modified example.

FIG. 4 is a side view of a schematic structure of a webbing retractor 50 according to a first modified example of the present embodiment. FIG. 5 is a perspective view of a piston ring 52 of the webbing retractor 50.

In a pretensioner 60 for a webbing retractor, of the webbing retractor 50 according to the first modified example, a resin piston ring 52 as a sealing member abuts the bottom surface of the piston 28. An upper wall portion 58, which is substantially ring-shaped, and a side wall portion 54, which extends from the external peripheral portion of the upper wall portion 58 obliquely downward toward the inner wall 36 of the cylinder 20, are formed at the piston ring 52, such that the entire piston ring 52 is structured in a substantially cylindrical shape. The upper wall portion 58 of the piston ring 52 is fitted onto the external periphery of the seal holding portion 32 of the piston 28, and thus the piston ring 52 is held on the piston 28. The side wall portion 54 of the piston ring 52 abuts the inner wall 36 of the cylinder 20, and the lower end of the side wall portion 54 of the piston ring 52 abuts the receiving portion 26 which is formed integrally with the inner wall 36.

The piston ring 52 is elastic, and thus, when the gas is supplied into the cylinder 20, the piston ring 52 is pressed against the bottom surface of the piston 28 by the gas pressure and the diameter of the piston ring 52 is increased, and the side wall portion 54 of the piston ring 52 is pressed against the inner wall 36 of the cylinder 20. Accordingly, when the pretensioner is operated, the piston ring 52 seals the gap between the piston 28 and the inner wall 36 of the cylinder 20. Further, an aperture portion 56 which is continuous with the upper wall portion 58 and the side wall portion 54 is formed in the piston ring 52. This aperture portion 56 permits gas flow from the bottom surface side of the piston 28 to the top surface side thereof. This prevents the gas pressure inside the cylinder 20 from excessively increasing. Further, the melting point of the material of which the piston ring 52 is formed is no more than the ignition temperature of the gas generating agent. When the pretensioner is operated in a high temperature state such as in a fire, portions of the piston ring 52 soften (liquefy), and the gas flows out from the bottom surface side of the piston 28 to the top surface side thereof. Thus, the piston ring 52 is structured so as to prevent the gas pressure inside the cylinder 20 from excessively increasing even in a high temperature state.

The operation of the present first modified example will now be explained.

In the webbing retractor 50 with the above structure, when the vehicle is in a state of emergency, the gas is supplied into the cylinder 20, and the piston 28 is moved in the direction of the arrow B in FIG. 4 by the gas pressure. When the piston 28 is moved in the direction of the arrow B in FIG. 4, the rack 30 is also moved together with the piston 28, and then the rack 30 meshes with the pinion 18 and rotates the pinion 18 in the direction in which the webbing 16 is wound (the direction of the arrow A in FIG. 4). When the pinion 18 is rotated in the direction in which the webbing 16 is wound, because the pinion 18 is connected to the winding shaft 14 via the unillustrated roller, the webbing 16 is wound onto the winding shaft 14 and the slackness in the webbing 16 is eliminated. When the piston 28 is moved by the gas pressure, the elastic and substantially cylindrical piston ring 52 is pressed against the bottom surface of the piston 28 by the gas pressure such that the diameter of the piston ring 52 is increased, and the side wall portion 54 of the piston ring 52 is pressed against the inner wall 36 of the cylinder 20. Accordingly, the piston ring 52 seals the gap between the piston 28 and the inner wall 36 of the cylinder 20, and the air-tightness between the piston 28 and the cylinder 20 is improved.

In this manner, merely by making the piston ring 52 abut against the bottom surface of the piston 28, the piston ring 52 can seal the gap between the piston 28 and the inner wall 36 of the cylinder 20, and thus, a conventional seal holding groove does not need to be formed in the piston 28. Therefore, a cutting process for forming the seal holding groove in the piston 28 is unnecessary. This facilitates the machining of the piston 28 and reduces the costs.

The upper wall portion 58 of the piston ring 52 is fitted onto the external periphery of the seal holding portion 32 which is formed integrally with the bottom surface of the piston 28, and thus the piston ring 52 does not come off from the piston 28. Therefore, the piston ring 52 can securely seal the gap between the piston 28 and the inner wall 36 of the cylinder 20.

Further, merely by fitting the upper wall portion 58 of the piston ring 52 onto the external periphery of the seal holding portion 32 which is formed integrally with the bottom surface of the piston 28, the piston ring 52 can be assembled with the piston 28. Therefore, increasing the diameter of an O ring to fit the O ring into the seal holding groove such as in the conventional manner is unnecessary. This facilitates assembly.

When the pretensioner is operated, the gas flows out from the bottom surface side of the piston 28 to the top surface side thereof through the aperture portion 56 of the piston ring 52. This prevents the gas pressure inside the cylinder 20 from excessively increasing. Accordingly, a conventional vent hole does not need to be formed in the piston 28. This facilitates the machining of the piston 28 and reduces the costs.

The piston ring 52 is formed in a substantially cylindrical shape, and the aperture portion 56 is formed in the piston ring 52. Thus, the diameter of the piston ring 52 is increased more easily by the gas pressure. This can improve the sealing of the gap between the piston 28 and the inner wall 36 of the cylinder 20 even more.

Moreover, the melting point of the material of which the piston ring 52 is formed is no more than the ignition temperature of the gas generating agent. Thus, when the pretensioner is operated in a high temperature state such as in a fire, portions of the piston ring 52 soften (liquefy), and the gas flows out from the bottom surface side of the piston 28 to the top surface side thereof. This can prevent the gas pressure inside the cylinder 20 from excessively increasing even in a high temperature state. Therefore, even if the strengths required of the cylinder 20, the rack 30, the pinion 18 and the like are set to lower levels, the parts can be prevented from being blown off and damaged by the gas pressure.

Second Modified Example

Figure 6:
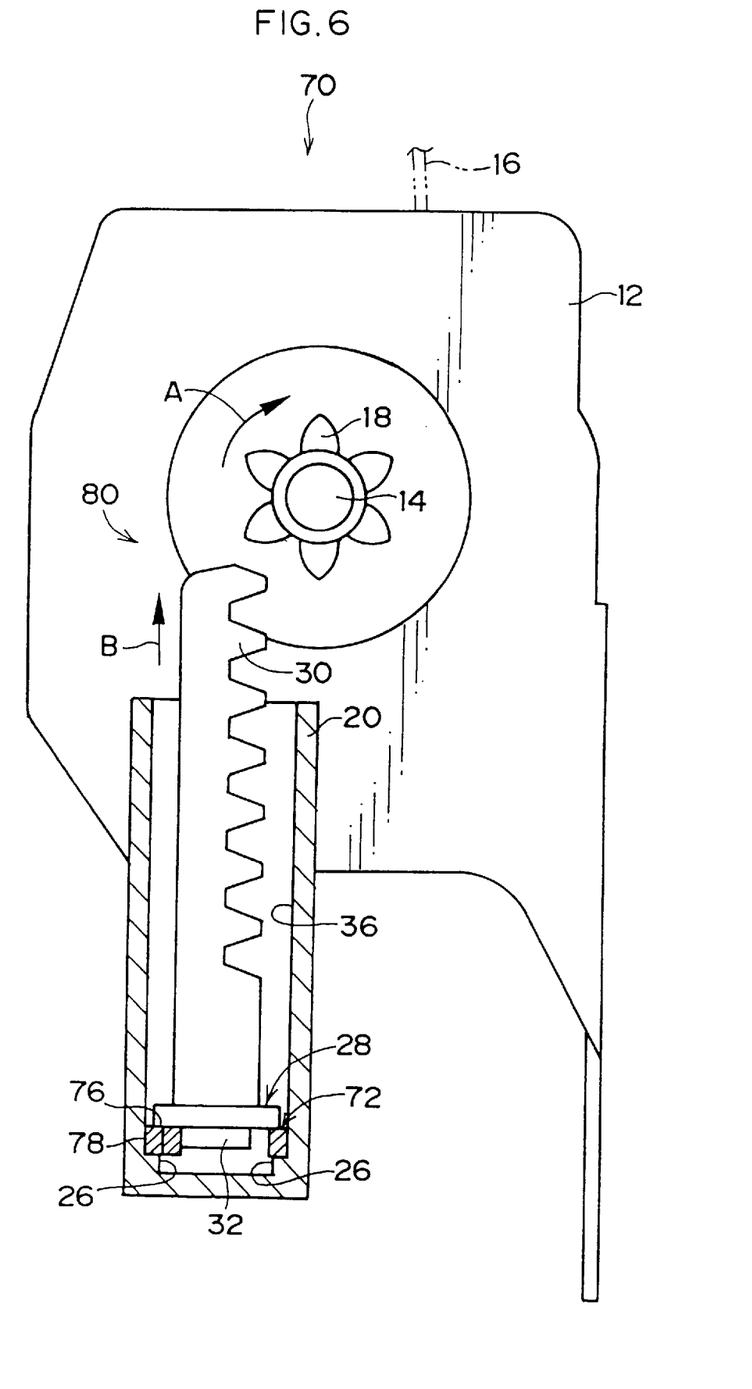
FIG. 6 is a side view of a schematic structure of a webbing retractor according to a second modified example of the present embodiment.
Figure 7:
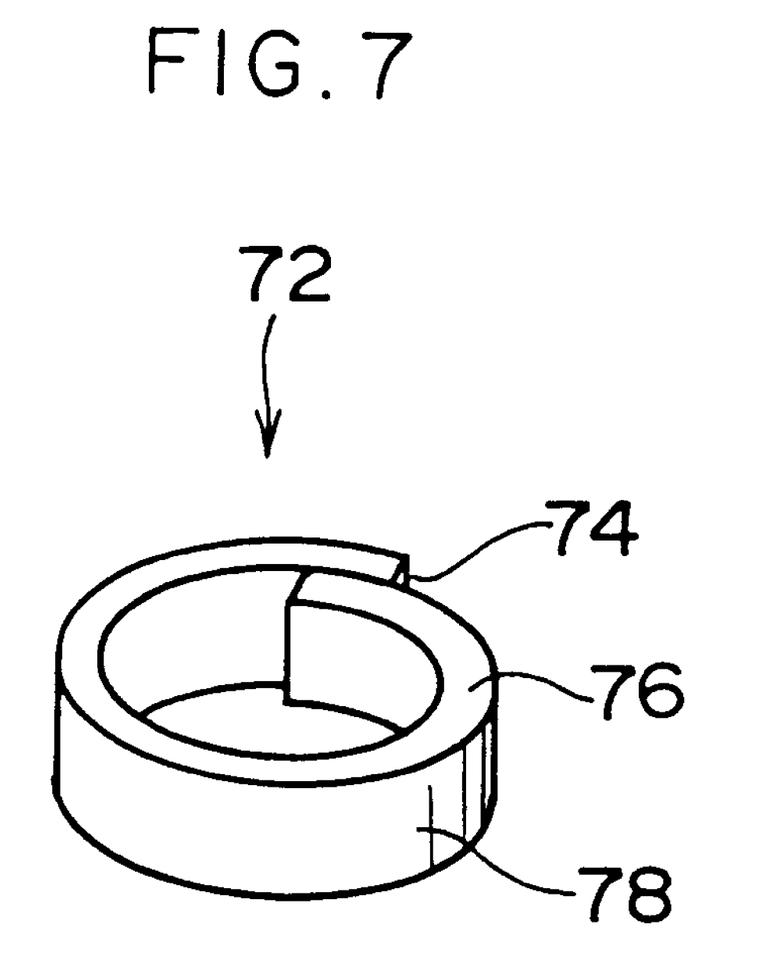
FIG. 7 is a perspective view of a piston ring of the webbing retractor according to the second modified example.

FIG. 6 is a side view of a schematic structure of a webbing retractor 70 according to a second modified example of the present embodiment. FIG. 7 is a perspective view of a piston ring 72 of the webbing retractor 70.

In a pretensioner 80 for a webbing retractor, of the webbing retractor 70 according to the second modified example, a resin piston ring 72 as a sealing member abuts the bottom surface of the piston 28. An upper wall portion 76, which is substantially ring-shaped, and a side wall portion 78, which extends vertically downward from the upper wall portion 76, are formed at the piston ring 72, such that the entire piston ring 72 is structured in a substantially cylindrical shape. The upper wall portion 76 of the piston ring 72 is fitted onto the external periphery of the seal holding portion 32 of the piston 28, and thus the piston ring 72 is held on the piston 28. The side wall portion 78 of the piston ring 72 abuts the inner wall 36 of the cylinder 20, and the lower end of the side wall portion 78 of the piston ring 72 abuts the receiving portion 26 which is formed integrally with the inner wall 36.

The piston ring 72 is elastic, and thus, when the gas is supplied into the cylinder 20, the piston ring 72 is pressed against the bottom surface of the piston 28 by the gas pressure and the diameter of the piston ring 72 is increased, and the side wall portion 78 of the piston ring 72 is pressed against the inner wall 36 of the cylinder 20. Accordingly, when the pretensioner is operated, the piston ring 72 seals the gap between the piston 28 and the inner wall 36 of the cylinder 20. The piston ring 72 is formed from a strip-shaped member having opposite end portions overlapped with each other, and adjacent to this overlapped portion, an aperture portion 74 which is continuous with the upper wall portion 76 and the side wall portion 78 is formed by the thickness of the side wall portion 78. This aperture portion 74 permits gas flow from the bottom surface side of the piston 28 to the top surface side thereof. This prevents the gas pressure inside the cylinder 20 from excessively increasing. Further, the melting point of the material of which the piston ring 72 is formed is no more than the ignition temperature of the gas generating agent. When the pretensioner is operated in a high temperature state such as in a fire, portions of the piston ring 72 soften (liquefy), and the gas flows out from the bottom surface side of the piston 28 to the top surface side thereof. Thus, the piston ring 72 is structured so as to prevent the gas pressure inside the cylinder 20 from excessively increasing even in a high temperature state.

The operation of the present second modified example will now be explained.

In the webbing retractor 70 with the above structure, when the vehicle is in a state of emergency, the gas is supplied into the cylinder 20, and the piston 28 is moved in the direction of the arrow B in FIG. 6 by the gas pressure. When the piston 28 is moved in the direction of the arrow B in FIG. 6, the rack 30 is also moved together with the piston 28, and then the rack 30 meshes with the pinion 18 and rotates the pinion 18 in the direction in which the webbing 16 is wound (the direction of the arrow A in FIG. 6). When the pinion 18 is rotated in the direction in which the webbing 16 is wound, because the pinion 18 is connected to the winding shaft 14 via the unillustrated roller, the webbing 16 is wound onto the winding shaft 14 and the slackness in the webbing 16 is eliminated. When the piston 28 is moved by the gas pressure, the elastic and substantially cylindrical piston ring 72 is pressed against the bottom surface of the piston 28 by the gas pressure such that the diameter of the piston ring 72 is increased, and the side wall portion 78 of the piston ring 72 is pressed against the inner wall 36 of the cylinder 20. Accordingly, the piston ring 72 seals the gap between the piston 28 and the inner wall 36 of the cylinder 20, and the air-tightness between the piston 28 and the cylinder 20 is improved.

In this manner, merely by making the piston ring 72 abut against the bottom surface of the piston 28, the piston ring 72 can seal the gap between the piston 28 and the inner wall 36 of the cylinder 20, and thus, a conventional seal holding groove does not need to be formed in the piston 28. Therefore, a cutting process for forming the seal holding groove in the piston 28 is unnecessary. This facilitates the machining of the piston 28 and reduces the costs.

The upper wall portion 76 of the piston ring 72 is fitted onto the external periphery of the seal holding portion 32 which is formed integrally with the bottom surface of the piston 28, and thus the piston ring 72 does not come off from the piston 28. Therefore, the piston ring 72 can securely seal the gap between the piston 28 and the inner wall 36 of the cylinder 20.

Further, merely by fitting the upper wall portion 76 of the piston ring 72 onto the external periphery of the seal holding portion 32 which is formed integrally with the bottom surface of the piston 28, the piston ring 72 can be assembled with the piston 28. Therefore, increasing the diameter of an O ring to fit the O ring into the seal holding groove such as in the conventional manner is unnecessary. This facilitates assembly.

When the pretensioner is operated, the gas flows out from the bottom surface side of the piston 28 to the top surface side thereof through the aperture portion 74 of the piston ring 72. This prevents the gas pressure inside the cylinder 20 from excessively increasing. Accordingly, a conventional vent hole does not need to be formed in the piston 28. This facilitates the machining of the piston 28 and reduces the costs.

The piston ring 72 is formed in a substantially cylindrical shape, and the aperture portion 74 is formed at the piston ring 72. Thus, the diameter of the piston ring 72 is increased more easily by the gas pressure. This can improve the sealing of the gap between the piston 28 and the inner wall 36 of the cylinder 20 even more.

Moreover, the melting point of the material of which the piston ring 72 is formed is no more than the ignition temperature of the gas generating agent. Thus, when the pretensioner is operated in a high temperature state such as in a fire, portions of the piston ring 72 soften (liquefy), and the gas flows out from the bottom surface side of the piston 28 to the top surface side thereof. This can prevent the gas pressure inside the cylinder 20 from excessively increasing even in a high temperature state. Therefore, even if the strengths required of the cylinder 20, the rack 30, the pinion 18 and the like are set to lower levels, the parts can be prevented from being blown off and damaged by the gas pressure.

Figure 8:
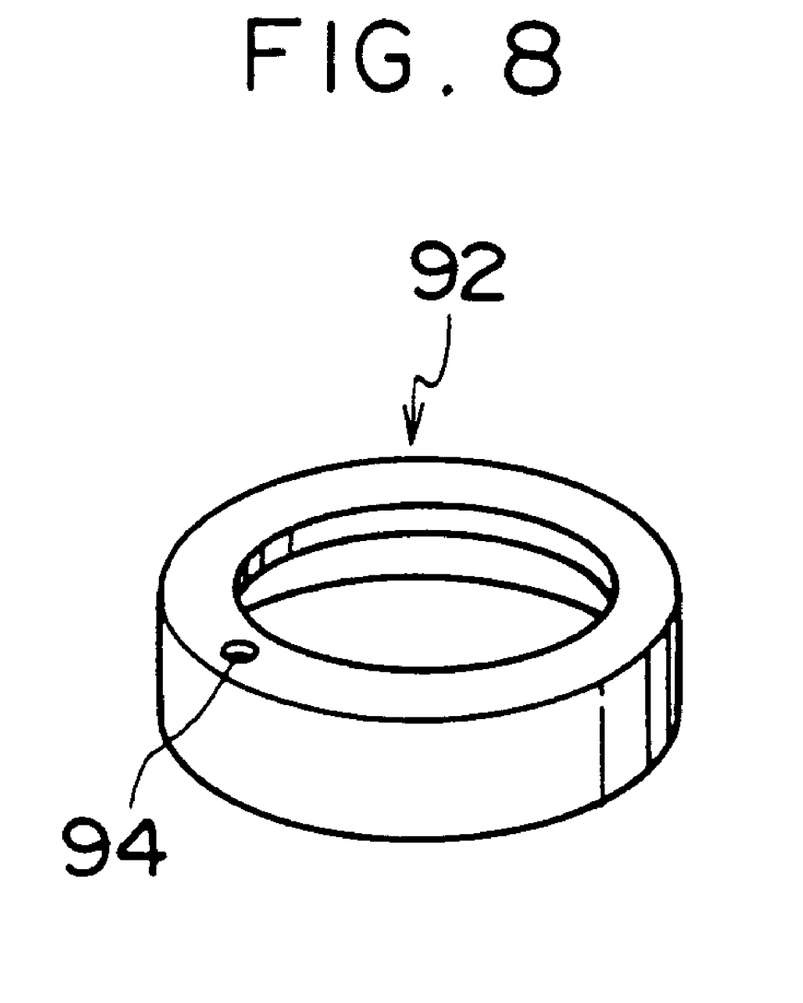
FIG. 8 is a perspective view of a piston ring of a webbing retractor according to another example of the present embodiment.

In each of the above-described embodiments (including the modified examples), the aperture portion is formed at the piston ring and is continuous with the upper wall portion and the side wall portion of the piston ring. However, a piston ring (sealing member) 92 shown in FIG. 8 may be structured to include an orifice 94 together with or instead of the aperture portion so that the gas flows out from the bottom surface side of the piston to the top surface side thereof through this orifice 94.

What is claimed is:

1. A pretensioner for use in a vehicle having a webbing retractor, the webbing retractor including webbing and a winding shaft for winding the webbing, and being for use with a gas generating agent, the pretensioner comprising:

a cylinder having an inner wall, the cylinder being for receiving gas therein from a gas generating agent when the vehicle is in a state of emergency;

a piston movably provided inside said cylinder for rotating the winding shaft in a direction for winding the webbing due to piston movement inside said cylinder caused by gas pressure;

a sealing member formed from an elastic material in an arcuate shape, and provided proximate a bottom surface of said piston for sealing a gap between said piston and the inner wall of said cylinder due to said sealing member being pressed against the bottom surface of said piston by gas pressure; and a cylindrical protruding seal holding portion having an upper wall portion and an external periphery formed integrally with the bottom surface of said piston, said sealing member extending arcuately around the external periphery of said seal holding portion, and said sealing member including a side wall portion proximate the inner wall of said cylinder, wherein said sealing member includes a discontinuity and said piston includes a bottom surface side and a top surface side, wherein the discontinuity defines a path of fluid communication from the bottom surface side of said piston to the top surface side of said piston.

2. A pretensioner for a webbing retractor according to claim 1, wherein the gas generating agent has an ignition temperature, and said sealing member is formed of a material having a melting point no more than the ignition temperature of the gas generating agent.

3. A pretensioner for a webbing retractor according to claim 1, wherein said sealing member includes an annular upper wall portion and has an external peripheral portion, and a side wall portion which extends vertically downward from the external peripheral portion of the upper wall portion.

4. A pretensioner for a webbing retractor according to claim 1, wherein said sealing member includes an upper wall portion which is substantially ring-shaped and has an external peripheral portion, and a side wall portion which extends from the external peripheral portion of the upper wall portion obliquely downward toward the inner wall of said cylinder.

5. A pretensioner for a webbing retractor according to claim 1, wherein said sealing member is formed from a strip of material having opposite end portions overlapped with each other.

6. A pretensioner for a webbing retractor according to claim 2, wherein said sealing member includes an upper wall portion which is substantially ring-shaped and has an external peripheral portion, and a side wall portion which extends vertically downward from the external peripheral portion of the upper wall portion.

7. A pretensioner for a webbing retractor according to claim 3, wherein the gas generating agent has an ignition temperature, and said sealing member is formed of a material having a melting point no more than the ignition temperature of the gas generating agent.

8. A pretensioner for use in a vehicle having a webbing retractor, the webbing retractor including webbing and a winding shaft for winding the webbing, and being for use with a gas generating agent, the pretensioner comprising:

a cylinder having an inner wall, the cylinder being for receiving gas therein from a gas generating agent when the vehicle is in a state of emergency;

a piston movably provided inside said cylinder for rotating the winding shaft in a direction for winding the webbing due to piston movement inside said cylinder caused by gas pressure;

a sealing member formed from an elastic material in an arcuate shape, and provided proximate a bottom surface of said piston for sealing a gap between said piston and the inner wall of said cylinder due to said sealing member being pressed against the bottom surface of said piston by gas pressure; and a cylindrical protruding seal holding portion having an upper wall portion and an external periphery formed integrally with the bottom surface of said piston, said sealing member extending arcuately around the external periphery of said seal holding portion, and said sealing member including a side wall portion proximate the inner wall of said cylinder, wherein said piston includes a bottom surface side and a top surface side, and an orifice is formed in said sealing member, the orifice permitting gas flow through the orifice from the bottom surface side of said piston to the top surface side of said piston.

9. A pretensioner for a webbing retractor according to claim 8, wherein the gas generating agent has an ignition temperature, and said sealing member is formed of a material having a melting point no more than the ignition temperature of the gas generating agent.

10. A pretensioner for use in a vehicle having a webbing retractor, the webbing retractor including webbing and a winding shaft for winding the webbing, and being for use with a gas generating agent, the pretensioner comprising:

a cylinder having an inner wall, the cylinder being for receiving gas therein from a gas generating agent when the vehicle is in a state of emergency;

a piston movably provided inside said cylinder, which rotates the winding shaft in a direction for retracting the webbing due to piston movement inside said cylinder in an axial direction of said cylinder due to gas pressure; and a sealing member formed of an elastic material, and having an annular side wall portion proximate the inner wall of said cylinder and a generally disc-shaped upper wall portion proximate a bottom surface of said piston for providing sealing between said piston and the inner wall of said cylinder by being pressed against the bottom surface of said piston by the gas pressure, wherein said sealing member includes a discontinuity, said piston having a bottom surface side and a top surface side, wherein the discontinuity defines a path of fluid communication from the bottom surface side of said piston to the top surface side of said piston through the sealing member.

11. A pretensioner for a webbing retractor according to claim 10, wherein a cylindrical protruding seal holding portion having an upper wall portion and an external periphery extending from the bottom surface of said piston, the upper wall portion of the sealing member fitting around the external periphery of said seal holding portion, and said sealing member includes a side wall portion proximate the inner wall of said cylinder.

12. A pretensioner for a webbing retractor according to claim 10, wherein the gas generating agent has an ignition temperature, and said sealing member is formed of a material having a melting point no more than the ignition temperature of the gas generating agent.

13. A pretensioner for a webbing retractor according to claim 10, wherein said sealing member is formed of resin.

14. A pretensioner for a webbing retractor according to claim 12, wherein said sealing member has a melting point which is no more than about 200° C.

15. A pretensioner for use in a vehicle having a webbing retractor, the webbing retractor including webbing and a winding shaft for winding the webbing, and being for use with a gas generating agent, the pretensioner comprising:

a cylinder having an inner wall, into which is supplied gas pressure generated by burning a gas generating agent when the vehicle is in a state of emergency;

a piston movably provided inside said cylinder, which rotates the winding shaft in a direction for winding the webbing due to piston movement inside said cylinder caused by gas pressure; and an annular member formed of an elastic material having a side wall portion abutting the inner wall of said cylinder and a generally disc-shaped upper wall portion abutting a bottom surface of said piston for providing sealing between said piston and the inner wall of said cylinder when pressed against the bottom surface of said piston by gas pressure, wherein said sealing member includes a discontinuity, said piston having a bottom surface side and a top surface side, wherein the discontinuity defines a path of fluid communication from the bottom surface side of said piston to the top surface side of said piston.

16. A pretensioner for a webbing retractor according to claim 15, wherein the gas generating agent has an ignition temperature, and said ring member is formed of a material having a melting point no more than the ignition temperature of the gas generating agent.

17. A sealing member for installation in a webbing retractor in a vehicle, the webbing retractor having a piston slidably disposed in a cylinder with a sidewall, wherein the piston includes a surface proximate the cylinder sidewall, the sealing member comprising an arcuate member formed of an elastic material which extends around the surface of the piston when installed, the arcuate member including a discontinuity defining a path of fluid communication through the member when installed on the piston for pressure relief.

* * * * *